US011283528B2

(12) United States Patent
Masuda et al.

(10) Patent No.: US 11,283,528 B2
(45) Date of Patent: Mar. 22, 2022

(54) DIGITAL COHERENT RECEIVER AND DIGITAL COHERENT RECEIVING METHOD

(71) Applicant: NIPPON TELEGRAPH AND TELEPHONE CORPORATION, Tokyo (JP)

(72) Inventors: Akira Masuda, Tokyo (JP); Seiji Okamoto, Tokyo (JP); Shuto Yamamoto, Tokyo (JP); Fukutaro Hamaoka, Tokyo (JP); Masanori Nakamura, Tokyo (JP); Asuka Matsushita, Tokyo (JP); Yoshiaki Kisaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/272,790

(22) PCT Filed: Aug. 27, 2019

(86) PCT No.: PCT/JP2019/033470
§ 371 (c)(1),
(2) Date: Mar. 2, 2021

(87) PCT Pub. No.: WO2020/054393
PCT Pub. Date: Mar. 19, 2020

(65) Prior Publication Data
US 2021/0218476 A1 Jul. 15, 2021

(30) Foreign Application Priority Data

Sep. 11, 2018 (JP) .............................. JP2018-169954

(51) Int. Cl.
*H04B 10/61* (2013.01)
*H04B 10/079* (2013.01)
*H04J 14/06* (2006.01)

(52) U.S. Cl.
CPC ... *H04B 10/6162* (2013.01); *H04B 10/07951* (2013.01); *H04B 10/6166* (2013.01); *H04J 14/06* (2013.01)

(58) Field of Classification Search
None
See application file for complete search history.

(56) References Cited

U.S. PATENT DOCUMENTS 9,369,213 B1 * 6/2016 Kakande .......... H04L 25/03197
10,374,718 B2 * 8/2019 Onuma .............. H04B 10/5161
(Continued)

FOREIGN PATENT DOCUMENTS

JP 2013223128 A 10/2013

*Primary Examiner* — Jai M Lee
(74) *Attorney, Agent, or Firm* — Harness, Dickey & Pierce, P.L.C.

(57) ABSTRACT

A digital coherent receiver includes: an adaptive equalizer configured to execute, using a first tap coefficient, adaptive equalization processing on a digital signal that corresponds to a signal; a first coefficient updating unit configured to update the first tap coefficient based on the digital signal on which the adaptive equalization processing has not been executed, the digital signal on which the adaptive equalization processing has been executed, and a first step size; a second coefficient updating unit configured to update a second tap coefficient based on the digital signal on which the adaptive equalization processing has not been executed, the digital signal on which the adaptive equalization processing has been executed, and a second step size; and a control unit configured to detect a fluctuation speed of a state of polarization of the digital signal based on the second tap coefficient, and change the first tap coefficient to the updated (Continued)

second tap coefficient if it is determined that the fluctuation speed is higher than or equal to a speed threshold.

8 Claims, 5 Drawing Sheets

(56) References Cited

U.S. PATENT DOCUMENTS

| | | | | |
|---|---|---|---|---|
| 10,422,719 | B2* | 9/2019 | Yamazaki | G01M 11/338 |
| 2010/0003028 | A1* | 1/2010 | Zhang | H04B 10/61 |
| | | | | 398/65 |
| 2011/0249971 | A1* | 10/2011 | Oda | H04B 10/2572 |
| | | | | 398/65 |
| 2012/0045208 | A1* | 2/2012 | Yasuda | H04L 27/223 |
| | | | | 398/65 |
| 2012/0134684 | A1* | 5/2012 | Koizumi | H04L 25/03044 |
| | | | | 398/202 |
| 2013/0251370 | A1* | 9/2013 | Ogasahara | H04B 10/6162 |
| | | | | 398/65 |
| 2014/0286638 | A1* | 9/2014 | Yasuda | H04B 10/6164 |
| | | | | 398/65 |
| 2015/0030330 | A1* | 1/2015 | Ogasahara | H04B 10/548 |
| | | | | 398/65 |

* cited by examiner

| SOP FLUCTUATION FREQUENCY | OPTIMAL STEP SIZE |
|---|---|
| 1kHz | 0.001 |
| 10kHz | 0.005 |
| 20kHz | 0.01 |
| 30kHz | 0.02 |
| 40kHz | 0.05 |
| 50kHz | 0.08 |

DIGITAL COHERENT RECEIVER AND DIGITAL COHERENT RECEIVING METHOD

CROSS-REFERENCE TO RELATED APPLICATIONS

This application is a 371 U.S. National Phase of International Application No. PCT/JP2019/033470 filed on Aug. 27, 2019, which claims priority to Japanese Application No. 2018-169954 filed on Sep. 11, 2018. The entire disclosures of the above applications are incorporated herein by reference.

TECHNICAL FIELD

The present invention relates to a digital coherent receiver and a digital coherent receiving method.

BACKGROUND ART

In digital coherent transmission, when a polarization-multiplexed signal is demultiplexed, there may be a case where digital signal processing cannot keep up with rapid fluctuations in the state of polarization (SOP) of the signal, and the bit error rate (BER) degrades.

Patent Document 1 discloses a method in which a digital coherent receiver adaptively controls the step size of a finite impulse response (FIR) filter based on the fluctuation speed of the state of polarization (hereinafter, referred to as "SOP fluctuation speed") (see Patent Document 1).

CITATION LIST

[Patent Document]
[Patent Document 1] Japanese Patent Application Publication No. 2013-223128

SUMMARY OF THE INVENTION

Technical Problem

In digital coherent transmission, the performance (hereinafter, referred to as "reception performance") of demultiplexing a received signal with digital signal processing is important. Accordingly, even if the state of polarization of the polarization-multiplexed signal fluctuates, the reception performance needs to be kept high. However, conventional digital coherent receivers have the problem that, when the state of polarization of a polarization-multiplexed signal fluctuates rapidly, the digital signal processing cannot keep up the fluctuation of the state of polarization, and the reception performance decreases.

In view of the above-described circumstances, an object of the present invention is to provide a digital coherent receiver and a digital coherent receiving method that can reduce the likelihood that reception performance may decrease when the state of polarization of a polarization-multiplexed signal fluctuates rapidly.

Means for Solving the Problem

One aspect of the present invention relates to a digital coherent receiver (first receiver) that includes: an adaptive equalizer configured to execute, using a first tap coefficient, adaptive equalization processing on a digital signal that corresponds to a polarization-multiplexed signal; a first coefficient updating unit configured to update the first tap coefficient based on the digital signal on which the adaptive equalization processing has not been executed, the digital signal on which the adaptive equalization processing has been executed, and a first step size; a second coefficient updating unit configured to update a second tap coefficient based on the digital signal on which the adaptive equalization processing has not been executed, the digital signal on which the adaptive equalization processing has been executed, and a second step size, which is larger than the first step size; and a control unit configured to detect a fluctuation speed of a state of polarization of the digital signal based on the second tap coefficient, determine whether or not the fluctuation speed is higher than or equal to a speed threshold, and change the first tap coefficient to the updated second tap coefficient if it is determined that the fluctuation speed is higher than or equal to the speed threshold.

One aspect of the present invention relates to a digital coherent receiver (second receiver) that includes: an adaptive equalizer configured to execute, using a tap coefficient, adaptive equalization processing on a digital signal that corresponds to a polarization-multiplexed signal; a coefficient updating unit configured to update the tap coefficient based on the digital signal on which the adaptive equalization processing has not been executed, the digital signal on which the adaptive equalization processing has been executed, and a step size that is periodically updated to a first size and a second size, which is larger than the first size; and a control unit configured to detect a fluctuation speed of a state of polarization of the digital signal based on the tap coefficient, determine whether or not the fluctuation speed is higher than or equal to a speed threshold, and stop the update of the step size and set the step size to the second size if it is determined that the fluctuation speed is higher than or equal to the speed threshold.

One aspect of the present invention relates to the above-described digital coherent receiver (first receiver), wherein if it is determined that the fluctuation speed is lower than the speed threshold, the adaptive equalizer executes the adaptive equalization processing using the first tap coefficient, and if it is determined that the fluctuation speed is higher than or equal to the speed threshold, the adaptive equalizer executes the adaptive equalization processing using the second tap coefficient.

One aspect of the present invention relates to the above-described digital coherent receiver (first receiver), wherein if it is determined that the fluctuation speed is lower than the speed threshold, the adaptive equalizer executes the adaptive equalization processing using the first tap coefficient and the second tap coefficient, and if it is determined that the fluctuation speed is higher than or equal to the speed threshold, the adaptive equalizer executes the adaptive equalization processing using the changed first tap coefficient and second tap coefficient.

One aspect of the present invention relates to the above-described digital coherent receiver (second receiver), wherein the adaptive equalizer executes the adaptive equalization processing using the tap coefficient for each combination of an X polarized wave and a Y polarized wave, the coefficient updating unit updates the tap coefficient for each of the combinations, based on the step size for the corresponding combination, and if it is determined that the fluctuation speed is higher than or equal to the speed threshold, the control unit stops the update of the step size for each of the combinations, and sets the step size for each of the combinations to the second size.

One aspect of the present invention relates to a digital coherent method that is executed by the above-described digital coherent receiver (first receiver), the method including the steps of: executing, using a first tap coefficient, adaptive equalization processing on a digital signal that corresponds to a polarization-multiplexed signal; updating the first tap coefficient based on the digital signal on which the adaptive equalization processing has not been executed, the digital signal on which the adaptive equalization processing has been executed, and a first step size; updating a second tap coefficient based on the digital signal on which the adaptive equalization processing has not been executed, the digital signal on which the adaptive equalization processing has been executed, and a second step size, which is larger than the first step size; and detecting a fluctuation speed of a state of polarization of the digital signal based on the second tap coefficient, determining whether or not the fluctuation speed is higher than or equal to a speed threshold, and changing the first tap coefficient to the updated second tap coefficient if it is determined that the fluctuation speed is higher than or equal to the speed threshold.

One aspect of the present invention relates to a digital coherent method that is executed by the above-described digital coherent receiver (second receiver), the method including the steps of: executing, using a tap coefficient, adaptive equalization processing on a digital signal that corresponds to a polarization-multiplexed signal; updating the tap coefficient based on the digital signal on which the adaptive equalization processing has not been executed, the digital signal on which the adaptive equalization processing has been executed, and a step size that is periodically updated to a first size and a second size, which is larger than the first size; and detecting a fluctuation speed of a state of polarization of the digital signal based on the tap coefficient, determining whether or not the fluctuation speed is higher than or equal to a speed threshold, and stopping the update of the step size and setting the step size to the second size if it is determined that the fluctuation speed is higher than or equal to the speed threshold.

One aspect of the present invention relates to the above-described digital coherent receiving method that is executed by the digital coherent receiver (first receiver), wherein if it is determined that the fluctuation speed is lower than the speed threshold, the adaptive equalizer executes the adaptive equalization processing using the first tap coefficient, and if it is determined that the fluctuation speed is higher than or equal to the speed threshold, the adaptive equalizer executes the adaptive equalization processing using the second tap coefficient.

Effects of the Invention

According to the present invention, it is possible to reduce the likelihood that reception performance may decrease when the state of polarization of a polarization-multiplexed signal fluctuates rapidly.

DESCRIPTION OF EMBODIMENTS

Embodiments of the present invention will be described in detail with reference to the drawings.

First Embodiment

Figure 1:
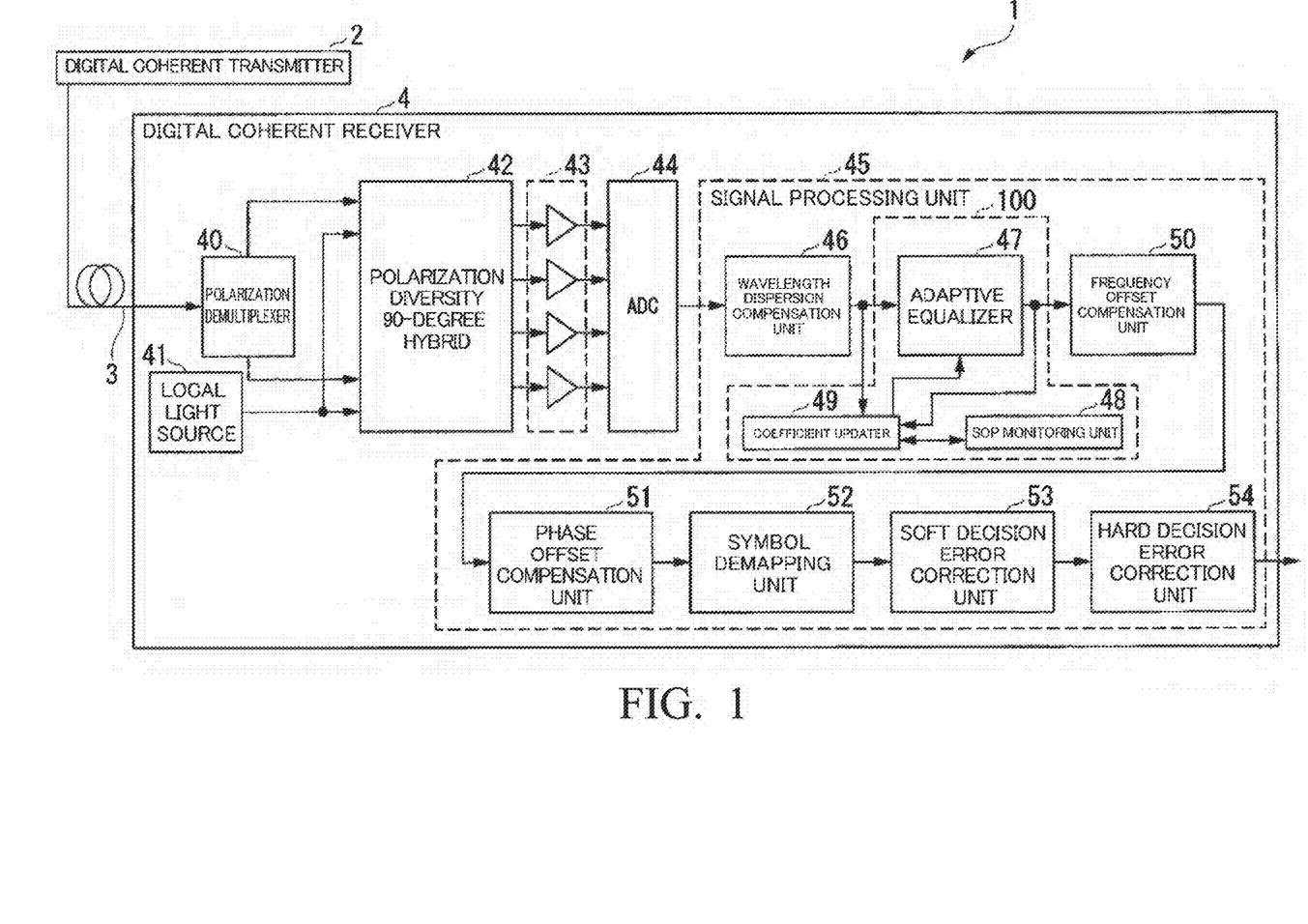
FIG. 1 is a diagram illustrating an example of a configuration of an optical communication system according to a first embodiment.

FIG. 1 is a diagram illustrating an example of a configuration of an optical communication system 1. The optical communication system 1 is a system for performing communication using polarization-multiplexed optical signals. The optical communication system 1 includes a digital coherent transmitter 2, a transmission path 3, and a digital coherent receiver 4.

The digital coherent transmitter 2 transmits a polarization-multiplexed optical signal to the digital coherent receiver 4 via the transmission path 3. The transmission path 3 includes an optical fiber and an amplifier. The digital coherent receiver 4 receives the polarization-multiplexed optical signal via the transmission path 3. The digital coherent receiver 4 demodulates the polarization-multiplexed optical signal, and generates a sequence of symbols as the demodulation result.

The digital coherent receiver 4 includes a polarization demultiplexer 40, a local light source 41 (local oscillation light source), a polarization diversity 90-degree hybrid 42, an amplifier 43, an analog-to-digital converter (ADC) 44, and a signal processing unit 45.

The polarization demultiplexer 40 demultiplexes polarization components of the received optical signal. The local light source 41 outputs local light (laser light) to the polarization diversity 90-degree hybrid 42. The polarization diversity 90-degree hybrid 42 mixes the received optical signal and local light to detect an in-phase signal and a quadrature-phase signal of the received optical signal. The polarization diversity 90-degree hybrid 42 outputs analog signals (current signals) that correspond to the detected in-phase signal and quadrature-phase signal to the amplifier 43.

The amplifier 43 is a trans-impedance amplifier. The amplifier 43 executes impedance conversion on the analog signals (current signals), thereby outputting analog signals (voltage signals) to the ADC 44. The ADC 44 is an analog-to-digital conversion unit. The ADC 44 converts the analog signals (voltage signals) into digital signals.

The signal processing unit 45 executes digital signal processing. The signal processing unit 45 includes a wavelength dispersion compensation unit 46, an adaptive equalizer 47, a SOP monitoring unit 48, a coefficient updater 49, a frequency offset compensation unit 50, a phase offset compensation unit 51, a symbol demapping unit 52, a soft decision error correction unit 53, and a hard decision error correction unit 54.

The wavelength dispersion compensation unit 46 executes processing for compensating wavelength dispersion that has occurred in the waveform of the optical signal in the transmission path 3, on the digital signal output from the ADC 44.

The adaptive equalizer 47 is a functional unit for compensating a distortion that has occurred in the waveform of the optical signal in the transmission path 3. That is to say, the adaptive equalizer 47 is a functional unit for correcting a code error that has occurred in the optical signal in the transmission path 3 due to inter-code interference (intersymbol interference). The adaptive equalizer 47 executes adaptive equalization processing using a finite impulse response filter (FIR filter) based on a tap coefficient set by the coefficient updater 49.

The SOP monitoring unit 48 (control unit) detects the SOP fluctuation speed of the digital signal input from the wavelength dispersion compensation unit 46 to the adaptive equalizer 47, based on an output from the coefficient updater 49. For example, the SOP monitoring unit 48 derives the value of a Stokes parameter indicating the state of polarization of the digital signal, based on the output from the coefficient updater 49. The SOP monitoring unit 48 periodically detects, based on the derived value of the Stokes parameter, the SOP fluctuation speed at a predetermined period. The SOP monitoring unit 48 periodically outputs information indicating the SOP fluctuation speed to the coefficient updater 49 at a predetermined period.

The SOP monitoring unit 48 determines whether or not a SOP fluctuation speed higher than or equal to a speed threshold has been detected during the predetermined period. If it is determined that a SOP fluctuation speed lower than the speed threshold has been detected during the predetermined period, that is, if it is determined that no SOP fluctuation speed higher than or equal to the speed threshold has been detected during the predetermined period, the SOP monitoring unit 48 outputs, to the coefficient updater 49, an instruction to switch the value of the step size parameter used by the coefficient updater 49 when it updates the tap coefficient, to a predetermined value in normal time.

The predetermined value in normal time refers to a preset value of the step size parameter that is used in a state in which no SOP fluctuation speed higher than or equal to the speed threshold is detected. That is, the predetermined value in normal time means a preset value of the step size parameter that is used in a state in which no rapid fluctuation in the state of polarization is detected. The predetermined value in normal time is preset based on, for example, a result of a simulation using a transmission condition close to a condition in which an optical signal is transmitted during the operation of the communication system 1.

If it is determined that a SOP fluctuation speed higher than or equal to the speed threshold has been detected during the predetermined period, the SOP monitoring unit 48 outputs, to the coefficient updater 49, an instruction to switch the value of the step size parameter used by the coefficient updater 49 when it updates the tap coefficient, to a value larger than the predetermined value in normal time. The larger the value of the step size parameter is, the more improved the possibility of digital signal processing keeping up with fluctuations, and the reception tolerance to an SOP fluctuation speed are.

The coefficient updater 49 determines, based on the SOP fluctuation speed detected by the SOP monitoring unit 48, the value of the step size parameter that is used when it updates the tap coefficient of the FIR filter of the adaptive equalizer 47.

Upon acquiring the instruction to switch the value of the step size parameter to a value larger than the predetermined value in normal time from the SOP monitoring unit 48, the coefficient updater 49 updates the value of the step size parameter to a value larger than the predetermined value in normal time. Upon acquiring the instruction to switch the value of the step size parameter to the predetermined value in normal time from the SOP monitoring unit 48, the coefficient updater 49 updates the value of the step size parameter to the predetermined value in normal time.

The coefficient updater 49 updates the tap coefficient of the FIR filter of the adaptive equalizer 47, based on the digital signal on which the wavelength dispersion compensation processing has been executed by the wavelength dispersion compensation unit 46, the digital signal on which the adaptive equalization processing has been executed by the adaptive equalizer 47, and the value of the step size parameter. The coefficient updater 49 sets the updated tap coefficient for the adaptive equalizer 47.

The frequency offset compensation unit 50 executes processing for compensating a frequency offset on the digital signal on which the adaptive equalization processing has been executed. The phase offset compensation unit 51 executes processing for compensating a phase offset on the digital signal for which the frequency offset has been compensated. The symbol demapping unit 52 executes demodulation processing on the digital signal for which the phase offset has been compensated. The symbol demapping unit 52 outputs a sequence of symbols generated based on the digital signal in the demodulation processing to the soft decision error correction unit 53.

The soft decision error correction unit 53 corrects an error of the sequence of symbols using soft decision. The hard decision error correction unit 54 corrects an error of the sequence of symbols using hard decision. The hard decision error correction unit 54 outputs the error-corrected sequence of symbols to a predetermined external device.

Hereinafter, the adaptive equalizer 47, the SOP monitoring unit 48, and the coefficient updater 49 are collectively referred to as an "adaptive equalization device" 100.

Next, the adaptive equalization device 100 will be described in detail.

Figure 2:
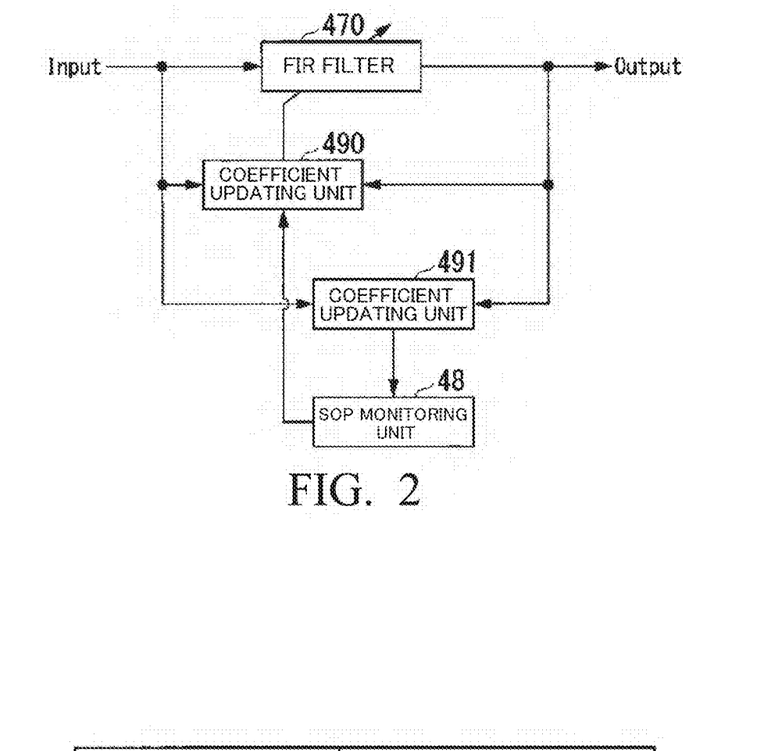
FIG. 2 is a diagram illustrating an example of a configuration of an adaptive equalization device according to the first embodiment.

FIG. 2 is a diagram illustrating an example of a configuration of the adaptive equalization device 100. In the first embodiment, the adaptive equalization device 100 uses a single-stage FIR filter to reduce the likelihood that the reception performance may decrease in the event of a fluctuation in the state of polarization. The adaptive equalization device 100 includes a FIR filter 470 (two-by-two butterfly structured FIR filter), a coefficient updating unit 490, a coefficient updating unit 491, and the SOP monitoring unit 48.

The FIR filter 470 is a two-by-two butterfly structured FIR filter. The FIR filter 470 executes, on the digital signal on which the wavelength dispersion compensation processing has been executed by the wavelength dispersion compensation unit 46, adaptive equalization processing based on the tap coefficient set by the coefficient updating unit 490. The FIR filter 470 outputs the digital signal on which the adaptive equalization processing has been executed by the FIR filter 470 to the frequency offset compensation unit 50.

The SOP monitoring unit 48 acquires the tap coefficient determined by the coefficient updating unit 491 from the coefficient updating unit 491. The SOP monitoring unit 48 derives, based on the tap coefficient determined by the coefficient updating unit 491, the value of the Stokes parameter indicating the state of polarization of the digital signal. The SOP monitoring unit 48 periodically detects, based on the derived value of the Stokes parameter, the SOP fluctuation speed at a predetermined period. The SOP monitoring unit 48 outputs information indicating the detected SOP fluctuation speed to the coefficient updating unit 490 and the coefficient updating unit 491.

The SOP monitoring unit 48 determines whether or not a SOP fluctuation speed higher than or equal to the speed threshold has been detected during the predetermined period. If it is determined that a SOP fluctuation speed higher than or equal to the speed threshold has been detected during the predetermined period, the SOP monitoring unit 48 outputs, to the coefficient updating unit 490, an instruction to switch the value of the step size parameter to a value larger than the predetermined value in normal time. Accordingly, the SOP monitoring unit 48 can change the tap coefficient of the FIR filter 470 to the tap coefficient updated by the coefficient updating unit 491 (tap coefficient that adapts to the SOP fluctuation speed).

If it is determined that a SOP fluctuation speed lower than the speed threshold has been detected during the predetermined period, the SOP monitoring unit 48 outputs, to the coefficient updating unit 490, an instruction to switch the value of the step size parameter to the predetermined value in normal time (instruction to set the value of the step size parameter back to the predetermined value in normal time).

Note that the SOP monitoring unit 48 may acquire the value of the step size parameter that is used by the coefficient updating unit 491 when it updates the tap coefficient, from the coefficient updating unit 491. The SOP monitoring unit 48 may also determine whether or not the value of the step size parameter that is used by the coefficient updating unit 491 when it updates the tap coefficient is equal to or greater than a threshold. If it is determined that the value of the step size parameter that is used by the coefficient updating unit 491 when it updates the tap coefficient is equal to or greater than the threshold, the SOP monitoring unit 48 may also determine that a SOP fluctuation speed higher than or equal to the predetermined speed threshold has been detected.

The coefficient updating unit 490 is a functional unit for updating the tap coefficient of the FIR filter 470. The coefficient updating unit 490 acquires, from the wavelength dispersion compensation unit 46, the digital signal on which the wavelength dispersion compensation processing has been executed. The coefficient updating unit 490 acquires, from the FIR filter 470, the digital signal on which the adaptive equalization processing has been executed by the FIR filter 470. The coefficient updating unit 490 acquires information indicating the SOP fluctuation speed from the SOP monitoring unit 48. The coefficient updating unit 490 derives the value of the step size parameter, based on a step size parameter data table and the SOP fluctuation speed.

Figure 3:
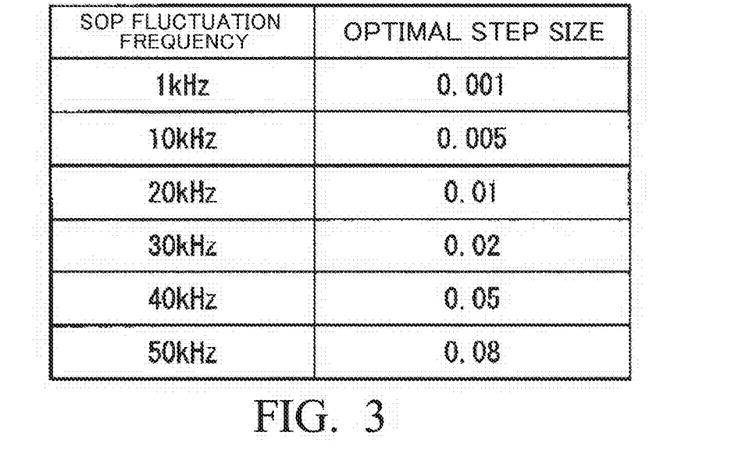
FIG. 3 is a diagram illustrating an example of a step size parameter data table according to the first embodiment.

FIG. 3 is a diagram illustrating an example of the step size parameter data table. The data table indicating the correspondence relationship between values of the step size parameter and the speed thresholds is preset as a result of a simulation being executed in advance before the operation of the optical communication system 1, the simulation being executed based on a transmission condition close to a condition in which an optical signal is transmitted during the operation of the optical communication system 1. In FIG. 3, the SOP fluctuation frequency, which is the SOP fluctuation speed, and the optimal step size set based on a simulation result are associated with each other. The step size parameter data table is stored in, for example, a storage unit of the digital coherent receiver 4.

The coefficient updating unit 490 acquires, from the SOP monitoring unit 48, an instruction (switching instruction) to switch the value of the step size parameter to the predetermined value in normal time. Upon acquiring the instruction (switching instruction) to switch the value of the step size parameter to the predetermined value in normal time from the SOP monitoring unit 48, the coefficient updating unit 490 updates the value of the step size parameter to the predetermined value in normal time.

When the coefficient updating unit 490 has acquired the instruction (switching instruction) to switch the value of the step size parameter to the predetermined value in normal time from the SOP monitoring unit 48, that is, when the coefficient updating unit 490 has not acquired the instruction (switching instruction) to switch the value of the step size parameter to a value larger than the predetermined value in normal time from the SOP monitoring unit 48, the coefficient updating unit 490 derives the value of the step size parameter, based on the step size parameter data table and the SOP fluctuation speed.

According to FIG. 3, when the coefficient updating unit 490 has acquired an instruction to switch the value of the step size parameter to the predetermined value in normal time from the SOP monitoring unit 48, and the SOP fluctuation frequency has changed from e.g., 1 kHz to e.g., 10 kHz, the coefficient updating unit 490 updates the value of the step size parameter that is used by the coefficient updating unit 490 when it updates the tap coefficient from "0.001" to "0.005".

According to FIG. 3, when the coefficient updating unit 490 has acquired an instruction to switch the value of the step size parameter to the predetermined value in normal time from the SOP monitoring unit 48, and the SOP fluctuation frequency has changed from e.g., 10 kHz to e.g., 1 kHz, the coefficient updating unit 490 updates the value of the step size parameter that is used by the coefficient updating unit 490 when it updates the tap coefficient from "0.005" to "0.001".

The coefficient updating unit 490 acquires, from the SOP monitoring unit 48, an instruction (switching instruction) to switch the value of the step size parameter to a value larger than the predetermined value in normal time. Upon acquiring the instruction (switching instruction) to switch the value of the step size parameter to a value larger than the predetermined value in normal time from the SOP monitoring unit 48, the coefficient updating unit 490 updates the value of the step size parameter to a value larger than the predetermined value in normal time.

According to FIG. 3, when the coefficient updating unit 490 has acquired an instruction to switch the value of the step size parameter to a value larger than the predetermined value in normal time from the SOP monitoring unit 48, and the SOP fluctuation frequency is e.g., 1 kHz, the coefficient updating unit 490 updates the value of the step size parameter to a value larger than the predetermined value in normal time (for example, a value equal to or greater than 0.005).

In this way, the coefficient updating unit 490 derives the value of the step size parameter, based on the step size parameter data table and the SOP fluctuation speed.

The coefficient updating unit 490 updates the tap coefficient of the FIR filter 470 using, for example, a constant modulus algorithm (CMA), based on the digital signal on which the wavelength dispersion compensation processing has been executed, the digital signal on which the adaptive equalization processing has been executed by the FIR filter 470, and the value of the step size parameter. The coefficient updating unit 490 sets the updated tap coefficient for the FIR filter 470.

Returning to FIG. 2, the example of the configuration of the adaptive equalization device 100 will further be described. The coefficient updating unit 491 is a functional unit for updating a tap coefficient. The coefficient updating unit 491 acquires, from the wavelength dispersion compensation unit 46, the digital signal on which the wavelength dispersion compensation processing has been executed. The coefficient updating unit 491 acquires, from the FIR filters 470, the digital signal on which the adaptive equalization processing has been executed by the FIR filters 470. The coefficient updating unit 491 acquires, from the SOP monitoring unit 48, information indicating the SOP fluctuation speed. The coefficient updating unit 491 derives the value of the step size parameter, based on the step size parameter data table and the SOP fluctuation speed.

The coefficient updating unit 491 updates the tap coefficient using, for example, the constant modulus algorithm, based on the digital signal on which the wavelength dispersion compensation processing has been executed, the digital signal on which the adaptive equalization processing has been executed by the FIR filter 470, and the value of the step size parameter. In the first embodiment, the coefficient updating unit 490 is a coefficient updating unit dedicated for the SOP monitoring unit 48. Accordingly, the tap coefficient updated by the coefficient updating unit 491 is not set for the FIR filter 470.

As described above, the digital coherent receiver 4 of the first embodiment includes the adaptive equalizer 47, the coefficient updating unit 490 (first coefficient updating unit), the coefficient updating unit 491 (second coefficient updating unit), and the SOP monitoring unit 48 (control unit). The adaptive equalizer 47 executes, using the tap coefficient (first tap coefficient) determined by the coefficient updating unit 490, the adaptive equalization processing on the digital signal that corresponds to the polarization-multiplexed signal. The coefficient updating unit 490 updates the above-described tap coefficient (first tap coefficient) determined by the coefficient updating unit 490, based on the digital signal on which the adaptive equalization processing has not been executed, the digital signal on which the adaptive equalization processing has been executed, and the value (first step size) of the first step size parameter. The coefficient updating unit 491 updates a second tap coefficient based on the digital signal on which the adaptive equalization processing has not been executed, the digital signal on which the adaptive equalization processing has been executed, and the value (second step size) of a second step size parameter, which is larger than the value of the first step size parameter. The SOP monitoring unit 48 detects, based on the tap coefficient (second tap coefficient) determined by the coefficient updating unit 491, the speed of fluctuation in the state of polarization (SOP fluctuation speed) of the digital signal. The SOP monitoring unit 48 determines whether or not the SOP fluctuation speed is higher than or equal to the speed threshold. If it is determined that the SOP fluctuation speed is higher than or equal to the speed threshold, the SOP monitoring unit 48 changes the value of the first tap coefficient to the value of the second tap coefficient updated by the coefficient updating unit 491. In this way, if it is determined that the SOP fluctuation speed is higher than or equal to the speed threshold, the SOP monitoring unit 48 changes the tap coefficient of the FIR filter 470 to the tap coefficient that adapts to the SOP fluctuation speed.

With this, the digital coherent receiver 4 of the first embodiment can reduce the likelihood that the reception performance may decrease when the state of polarization of a polarization-multiplexed signal fluctuates rapidly.

Since the adaptive equalization device 100 of the first embodiment uses the single-stage FIR filter to reduce the likelihood that the reception performance may decrease in the event of a fluctuation in the state of polarization, the circuit size of the adaptive equalization device 100 of the first embodiment is smaller than the circuit size of a configuration in which two-stage FIR filters are used to reduce the likelihood that the reception performance may decrease in the event of a fluctuation in the state of polarization.

The adaptive equalization device 100 of the first embodiment includes the coefficient updating unit 491 dedicated for the SOP monitoring unit 48. Accordingly, the adaptive equalization device 100 of the first embodiment detects fluctuations in the state of polarization fast and frequently, and can adaptively control the value of the step size parameter of the FIR filter 470 in the event of a rapid fluctuation in the state of polarization, thereby reducing the likelihood that the reception performance may decrease when the state of polarization of a polarization-multiplexed signal fluctuates rapidly. Since the adaptive equalization device 100 of the first embodiment detects a fluctuation in the state of polarization fast and frequently, and selects the optimal value of the step size parameter based on the amount of fluctuation in the state of polarization, it is possible to prevent degradation of the bit error rate.

Second Embodiment

A second embodiment differs from the first embodiment in that the adaptive equalization device 100 includes one coefficient updating unit. In the second embodiment, the difference from the first embodiment will be described.

Figure 4:
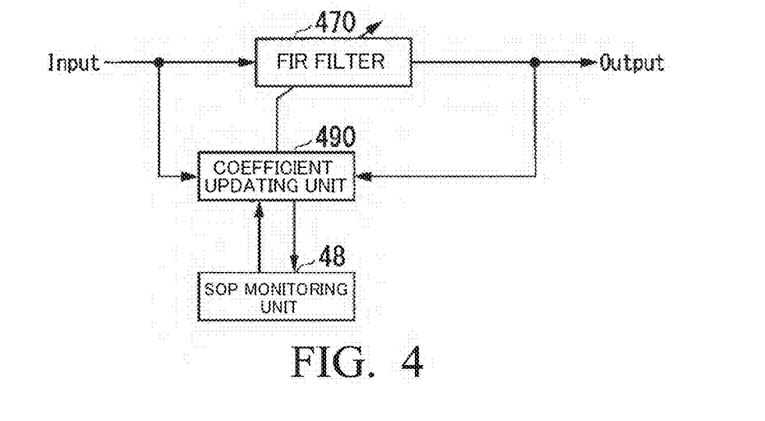
FIG. 4 is a diagram illustrating an example of a configuration of the adaptive equalization device according to a second embodiment.

FIG. 4 is a diagram illustrating an example of a configuration of the adaptive equalization device 100. In the second embodiment, the adaptive equalization device 100 uses a single-stage FIR filter to reduce the likelihood that the reception performance may decrease in the event of a fluctuation in the state of polarization. The adaptive equalization device 100 includes the FIR filter 470 (two-by-two FIR filter (two-by-two butterfly structured FIR filter)), the coefficient updating unit 490, and the SOP monitoring unit 48.

The coefficient updating unit 490 is a functional unit for updating the tap coefficient for each of combinations (XX, XY, YX, and YY) of an X polarized wave and a Y polarized wave. The coefficient updating unit 490 periodically changes the value (step size) of the step size parameter at a predetermined period in accordance with a switching instruction given from the SOP monitoring unit 48. For example, the coefficient updating unit 490 periodically updates the value of the step size parameter in the order of "small (predetermined value in normal time)", "large (value larger than the predetermined value in normal time)", and "small (predetermined value in normal time)", . . . .

The coefficient updating unit 490 updates the tap coefficient of the FIR filter 470, based on the periodically updated value of the step size parameter, and the SOP fluctuation speed. The coefficient updating unit 490 sets the updated tap coefficient for the FIR filter 470.

The SOP monitoring unit 48 acquires the tap coefficient determined by the coefficient updating unit 490, and the value of the step size parameter used by the coefficient updating unit 490. During a time period in which the value of the step size parameter used by the coefficient updating unit 490 is larger than the predetermined value in normal time, the SOP monitoring unit 48 derives the value of the Stokes parameter indicating the state of polarization of the digital signal, based on the tap coefficient determined by the coefficient updating unit 490. The SOP monitoring unit 48 periodically detects, based on the derived value of the Stokes parameter, the SOP fluctuation speed at a predetermined period. The SOP monitoring unit 48 outputs information indicating the detected SOP fluctuation speed to the coefficient updating unit 490.

The SOP monitoring unit 48 determines whether or not a SOP fluctuation speed higher than or equal to a predetermined speed threshold has been detected during the time period in which the value of the step size parameter used by the coefficient updating unit 490 is larger than the predetermined value in normal time.

If it is determined that a SOP fluctuation speed higher than or equal to the predetermined speed threshold has been detected during the predetermined period, the SOP monitoring unit 48 stops the processing for transmitting a periodical switching instruction to the coefficient updating unit 490, and outputs an instruction to switch the value of the step size parameter to a value larger than the predetermined value in normal time, to the coefficient updating unit 490. With this, the SOP monitoring unit 48 can change the tap coefficient of the FIR filter 470 to a tap coefficient that adapts to the SOP fluctuation speed.

If it is determined that a SOP fluctuation speed lower than the speed threshold has been detected during the predetermined period, the SOP monitoring unit 48 outputs, to the coefficient updating unit 490, an instruction to switch the value of the step size parameter to the predetermined value in normal time that is to be periodically updated (instruction to set the value of the step size parameter back to the value of the step size parameter to be periodically updated in the normal time where no rapid fluctuation in the state of polarization is detected).

As described above, the digital coherent receiver 4 of the second embodiment includes the adaptive equalizer 47, the coefficient updating unit 490, and the SOP monitoring unit (control unit). The adaptive equalizer 47 executes, using the tap coefficient of the FIR filter 470, adaptive equalization processing on the digital signal derived from the polarization-multiplexed signal. The coefficient updating unit 490 updates the tap coefficient based on the digital signal on which the adaptive equalization processing has not been executed, the digital signal on which the adaptive equalization processing has been executed, and the step size that is periodically updated to "small (predetermined value in normal time)" (first size) and "large (value larger than the predetermined value in normal time)" (second size), which is larger than "small (predetermined value in normal time)". The SOP monitoring unit 48 (control unit) detects the fluctuation speed of the state of polarization (SOP fluctuation speed) of the digital signal based on the tap coefficient. The SOP monitoring unit 48 determines whether or not the fluctuation speed is higher than or equal to the speed threshold. If it is determined that the SOP fluctuation speed is higher than or equal to the speed threshold, the SOP monitoring unit 48 stops the update of the value (step size) of the step size parameter, and sets the value of the step size parameter to "large (value larger than the predetermined value in normal time)" (second size).

With this, the digital coherent receiver 4 of the second embodiment can reduce the likelihood that the reception performance may decrease when the state of polarization of a polarization-multiplexed signal fluctuates rapidly.

Since the adaptive equalization device 100 of the second embodiment uses the single-stage FIR filter to reduce the likelihood that the reception performance may decrease in the event of a fluctuation in the state of polarization, the circuit size of the adaptive equalization device 100 of the second embodiment is smaller than the circuit size of a configuration in which two-stage FIR filters are used to reduce the likelihood that the reception performance may decrease in the event of a fluctuation in the state of polarization. Since the adaptive equalization device 100 of the second embodiment includes only one coefficient updating unit, the circuit size of the adaptive equalization device 100 of the second embodiment is smaller than the circuit size of the adaptive equalization device 100 of the first embodiment.

The coefficient updating unit 490 of the second embodiment periodically changes the value (step size) of the step size parameter at a predetermined period in accordance with a periodical switching instruction from the SOP monitoring unit 48. The adaptive equalization device 100 of the second embodiment detects fluctuations in the state of polarization fast and frequently, and selects the optimal value of the step size parameter based on the amount of fluctuation in the state of polarization, it is possible to prevent degradation of the bit error rate.

Third Embodiment

A third embodiment differs from the first embodiment in that the SOP monitoring unit 48 selects, from among a plurality of coefficient updating units, a coefficient updating unit that is to set the tap coefficient for the FIR filter 470. In the third embodiment, the difference from the first embodiment will be described.

Figure 5:
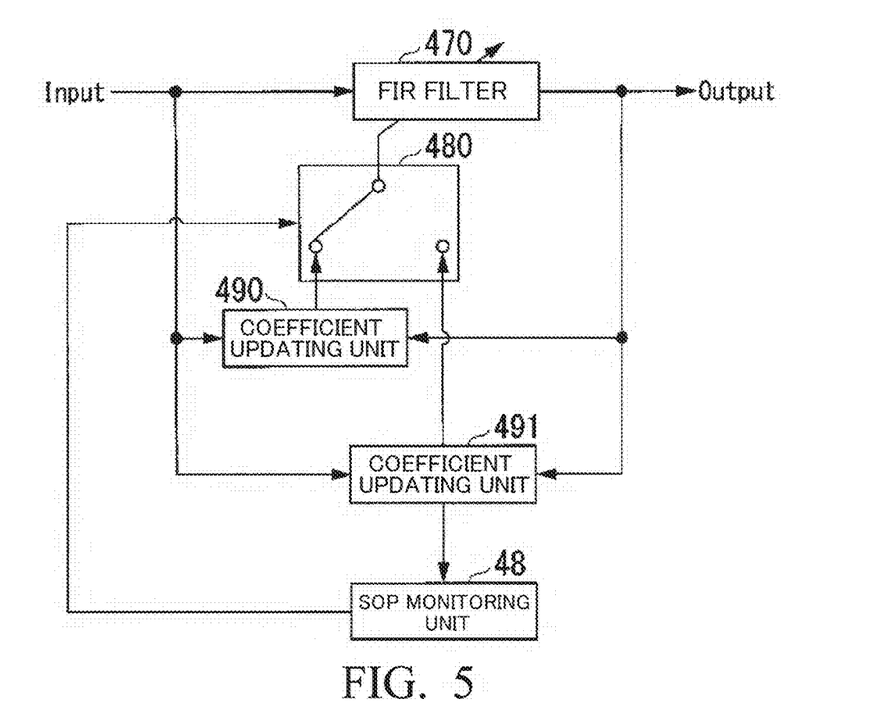
FIG. 5 is a diagram illustrating an example of a configuration of the adaptive equalization device according to a third embodiment.

FIG. 5 is a diagram illustrating an example of a configuration of the adaptive equalization device 100. In the third embodiment, the adaptive equalization device 100 uses a single-stage FIR filter to reduce the likelihood that the reception performance may decrease in the event of a fluctuation in the state of polarization. The adaptive equalization device 100 includes the FIR filter 470, a switching unit 480, the coefficient updating unit 490, the coefficient updating unit 491, and the SOP monitoring unit 48.

The coefficient updating unit 490 is a functional unit for updating the tap coefficient of the FIR filter 470 via the switching unit 480. The coefficient updating unit 490 determines the tap coefficient based on the predetermined value in normal time set for the step size parameter. The coefficient updating unit 490 outputs the updated tap coefficient to the switching unit 480.

The coefficient updating unit 491 is a functional unit for updating the tap coefficient of the FIR filter 470 via the switching unit 480. The coefficient updating unit 491 determines the tap coefficient based on a value of the step size parameter that is larger than the value of the step size parameter (predetermined value in normal time) determined by the coefficient updating unit 490. That is to say, the coefficient updating unit 491 determines the tap coefficient based on a value larger than the predetermined value in normal time. The coefficient updating unit 491 outputs the updated tap coefficient to the switching unit 480.

If it is determined that a SOP fluctuation speed lower than the speed threshold has been detected during the predetermined period, that is, if it is determined that no SOP fluctuation speed higher than or equal to the speed threshold has been detected during the predetermined period, the SOP monitoring unit 48 selects the coefficient updating unit 490. If it is determined that a SOP fluctuation speed lower than the speed threshold has been detected during the predetermined period, the SOP monitoring unit 48 outputs the selection result indicating the coefficient updating unit 490 to the switching unit 480.

If it is determined that a SOP fluctuation speed higher than or equal to the speed threshold has been detected during the predetermined period, the SOP monitoring unit 48 selects the coefficient updating unit 491. If it is determined that a SOP fluctuation speed higher than or equal to the speed threshold has been detected during the predetermined period, the SOP monitoring unit 48 outputs the selection result indicating the coefficient updating unit 491 to the switching unit 480. Accordingly, the SOP monitoring unit 48 can change the tap coefficient of the FIR filter 470 to a tap coefficient that adapts to the SOP fluctuation speed.

Note that, if it is determined that a SOP fluctuation speed higher than or equal to the speed threshold has been detected during the predetermined period, the SOP monitoring unit 48 may set the tap coefficient and step size parameter updated by the coefficient updating unit 491 for the coefficient updating unit 490. In this case, the tap coefficient determined by the coefficient updating unit 490 based on the tap coefficient and step size parameter updated by the coefficient updating unit 491 is set for the FIR filter 470. The adaptive equalization device 100 may not necessarily include the switching unit 480.

Upon acquiring the selection result indicating the coefficient updating unit 490 from the SOP monitoring unit 48, the switching unit 480 sets the tap coefficient updated by the coefficient updating unit 490 for the FIR filter 470. Upon acquiring the selection result indicating the coefficient updating unit 491 from the SOP monitoring unit 48, the switching unit 480 sets the tap coefficient updated by the coefficient updating unit 491 for the FIR filter 470.

As described above, the adaptive equalizer 47 of the third embodiment executes, using the tap coefficient (first tap coefficient) determined by the coefficient updating unit 490, the adaptive equalization processing if it is determined that the SOP fluctuation speed is lower than the speed threshold. The adaptive equalizer 47 of the third embodiment executes, using the tap coefficient (second tap coefficient) determined by the coefficient updating unit 491, the adaptive equalization processing if it is determined that the SOP fluctuation speed is higher than or equal to the speed threshold.

With this, the digital coherent receiver 4 of the third embodiment can reduce the likelihood that the reception performance may decrease when the state of polarization of a polarization-multiplexed signal fluctuates rapidly.

Since the adaptive equalization device 100 of the third embodiment uses the single-stage FIR filter to reduce the likelihood that the reception performance may decrease in the event of a fluctuation in the state of polarization, the circuit size of the adaptive equalization device 100 of the third embodiment is smaller than the circuit size of a configuration in which the two-stage FIR filters are used to reduce the likelihood that the reception performance may decrease in the event of a fluctuation in the state of polarization.

Fourth Embodiment

A fourth embodiment differs from the second embodiment in that coefficient updating units individually change the respective values ($\mu_{xx}$, $\mu_{xy}$, $\mu_{yx}$ and $\mu_{yy}$) of the step size parameter for the combinations of an X polarized wave and a Y polarized wave. In the fourth embodiment, the difference from the second embodiment will be described.

Figure 6:
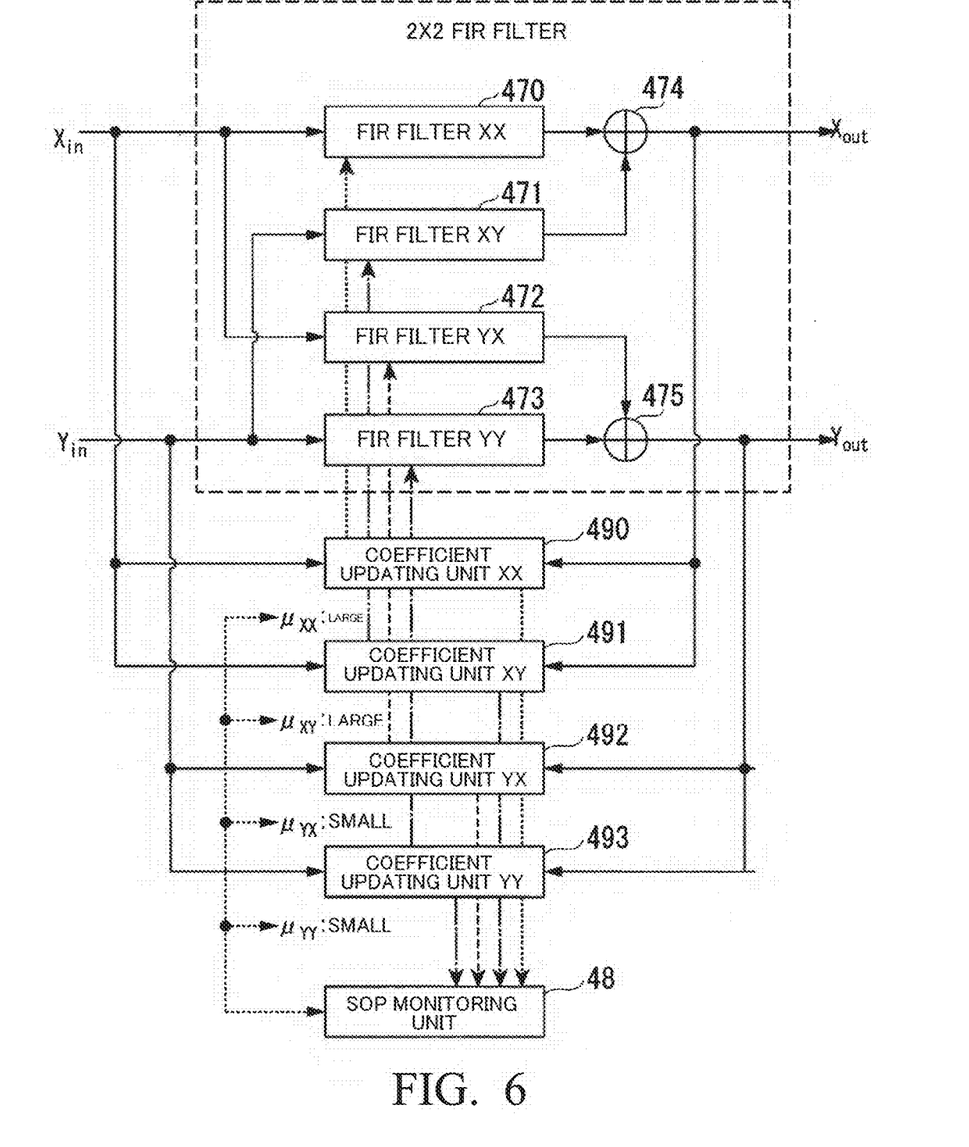
FIG. 6 is a diagram illustrating an example of a configuration of the adaptive equalization device according to a fourth embodiment.

FIG. 6 is a diagram illustrating an example of a configuration of the adaptive equalization device 100. In the fourth embodiment, the adaptive equalization device 100 uses four single-stage FIR filters to reduce the likelihood that the reception performance may decrease in the event of a fluctuation in the state of polarization. The adaptive equalization device 100 includes the FIR filter 470, a FIR filter 471, a FIR filter 472, a FIR filter 473, a multiplexing unit 474, a multiplexing unit 475, the coefficient updating unit 490, the coefficient updating unit 491, a coefficient updating unit 492, a coefficient updating unit 493, and the SOP monitoring unit 48.

The FIR filter 470, the FIR filter 471, the FIR filter 472, and the FIR filter 473 constitute "two-by-two FIR filters (two-by-two butterfly structured FIR filters)". Inputs of the two-by-two FIR filters are digital signals on which wavelength dispersion processing of an X polarized wave and a Y polarized wave (two systems) has been executed. Outputs of the two-by-two FIR filters are digital signals on which adaptive equalization processing of an X polarized wave and a Y polarized wave (two systems) has been executed.

The multiplexing unit 474 outputs, to the frequency offset compensation unit 50, a result "$X_{out}$" obtained by multiplexing an output of the FIR filter 470 and an output of the FIR filter 471. The multiplexing unit 475 outputs, to the frequency offset compensation unit 50, a result "$Y_{out}$" obtained by multiplexing an output of the FIR filter 472 and an output of the FIR filter 473.

The coefficient updating unit 490 calculates, using the constant modulus algorithm for example, the tap coefficient $P_{xx}$ of the FIR filter 470 based on Formula (1). n denotes the sample number of a received signal.

$$Pxx(n+1)=Pxx(n)+\mu_{xx}(1-|E_X(n)|^2)E_X(n)E_x^*(n) \quad \text{(Formula 1)}$$

The coefficient updating unit 491 calculates, using the constant modulus algorithm for example, the tap coefficient $P_{xy}$ of the FIR filter 471 based on Formula (2).

$$Pxy(n+1)=Pxy(n)+\mu_{xy}(1-|E_X(n)|^2)E_X(n)E_y^*(n) \quad \text{(Formula 2)}$$

The coefficient updating unit 492 calculates, using the constant modulus algorithm for example, the tap coefficient $P_{yx}$ of the FIR filter 472 based on Formula (3).

$$Pyx(n+1)=Pyx(n)+\mu_{yx}(1-|E_Y(n)|^2)E_Y(n)E_x^*(n) \quad \text{(Formula 3)}$$

The coefficient updating unit 493 calculates, using the constant modulus algorithm for example, the tap coefficient $P_{yy}$ of the FIR filter 473 based on the Formula (4). In this way, the tap coefficients of the FIR filters are independent from each other.

$$Pyy(n+1)=Pyy(n)+\mu_{yy}(1-|E_Y(n)|^2)E_Y(n)E_y^*(n) \quad \text{(Formula 4)}$$

In the normal time where no rapid fluctuation in the state of polarization is detected, the SOP monitoring unit 48 uses a switching instruction to set the value of the step size parameter of any of the FIR filters 470 to 473 to a value larger than the predetermined value in normal time, thereby detecting a SOP fluctuation speed higher than or equal to the speed threshold in the predetermined period.

Hereinafter, $\mu_{xx}$ denotes a step size parameter that is used by the coefficient updating unit 490. $\mu_{xy}$ denotes a step size parameter that is used by the coefficient updating unit 491. $\mu_{yx}$ denotes a step size parameter that is used by the coefficient updating unit 492. $\mu_{yy}$ denotes a step size parameter that is used by the coefficient updating unit 493.

In the normal time where no rapid fluctuation in the state of polarization is detected, the four step size parameters ($\mu_{xx}$, $\mu_{xy}$, $\mu_{yx}$ and $\mu_{yy}$) can have any value combination of "large (value larger than the predetermined value in normal time)" and "small (predetermined value in normal time)".

For example, the combination of "large" and "small" for ($\mu_{xx}$, $\mu_{xy}$, $\mu_{yx}$ and $\mu_{yy}$) is (large, small, small, small), (large, large, small, small), (large, small, small, large), or (large, large, large, small).

In the normal time where no rapid fluctuation in the state of polarization is detected, the SOP monitoring unit 48 may use switching instructions to periodically change the values of the four step size parameters at a predetermined period. Accordingly, the SOP monitoring unit 48 can average the convergence accuracy of the FIR filters. For example, the combination of "large" and "small" for ($\mu_{xx}$, $\mu_{xy}$, $\mu_{yx}$ and $\mu_{yy}$) is (large, small, small, small) at time $t_1$, (small, large, small, small) at time $t_2$, (small, small, large, small) at time $t_3$, and (small, small, small, large) at time $t_4$.

Note that in the normal time where no rapid fluctuation in the state of polarization is detected, the SOP monitoring unit 48 may also detect the SOP fluctuation speed based on the tap coefficient derived using the predetermined value in normal time for the step size parameter. Based on the thus detected SOP fluctuation speed, the SOP monitoring unit 48 may cause the coefficient updating units to switch the value of the step size parameter. Accordingly, the SOP monitoring unit 48 can improve the convergence performance of each of the FIR filters.

In order to detect the SOP fluctuation speed, the SOP monitoring unit 48 needs only to focus on two elements that include one $u_1$ and one $u_2$, among the four matrix elements indicating the states of polarization in Formula (5).

[Formula 5]

$$\begin{bmatrix} X \\ Y \end{bmatrix} = \begin{bmatrix} J_{11} & J_{12} \\ J_{21} & J_{22} \end{bmatrix}\begin{bmatrix} x \\ y \end{bmatrix} = \begin{bmatrix} u_1 & u_2 \\ -u_2^* & u_1^* \end{bmatrix}\begin{bmatrix} x \\ y \end{bmatrix} = \begin{bmatrix} \sqrt{\alpha} & \sqrt{\alpha-1}\,e^{j\varphi} \\ -\sqrt{\alpha-1}\,e^{-j\varphi} & \sqrt{\alpha} \end{bmatrix}\begin{bmatrix} x \\ y \end{bmatrix} \quad (5)$$

In Formula (5), x denotes an input of an X polarized wave of a FIR filter. y denotes an input of a Y polarized wave of the FIR filter. X denotes an output of the X polarized wave of the FIR filter. Y denotes an output of the Y polarized wave of the FIR filter. * denotes complex conjugate. α denotes a bifurcation ratio ($0 \leq \alpha \leq 1$) between the X polarized wave and the Y polarized wave. φ denotes a phase difference between the X polarized wave and the Y polarized wave.

The SOP monitoring unit 48 acquires, for the sample number n, the value of the center tap of the tap coefficient $P_{xx}$ of the FIR filter 470, the value of the center tap of the tap coefficient $P_{xy}$ of the FIR filter 471, the value of the center tap of the tap coefficient $P_{yx}$ of the FIR filter 472, and the value of the center tap of the tap coefficient $P_{yy}$ of the FIR filter 473.

The SOP monitoring unit 48 derives, based on Formulae (6) to (12), Stokes vectors $S_1$, $S_2$, and $S_3$ of at least one of the output of the X polarized wave and the output of the Y polarized wave. t denotes time.

[Formula 6]
$$S_1 = \cos(2\varphi)\cos(2\psi) \quad (6)$$

[Formula 7]
$$S_2 = \sin(2\varphi)\cos(2\psi) \quad (7)$$

[Formula 8]
$$S_3 = \sin(2\psi) \quad (8)$$

[Formula 9]
$$\varphi_X = \arctan\left(\frac{|P_{xy,center}|}{|P_{xx,center}|}\right) \quad (9)$$

[Formula 10]
$$\varphi_Y = \arctan\left(\frac{|P_{yx,center}|}{|P_{yy,center}|}\right) \quad (10)$$

[Formula 11]
$$\psi_X = \arctan\left(\frac{\mathrm{Im}\left\{\frac{P_{xy,center}}{P_{xx,center}}\right\}}{\mathrm{Re}\left\{\frac{P_{xy,center}}{P_{xx,center}}\right\}}\right) \quad (11)$$

[Formula 12]
$$\psi_Y = \arctan\left(\frac{\mathrm{Im}\left\{\frac{P_{yx,center}}{P_{yy,center}}\right\}}{\mathrm{Re}\left\{\frac{P_{yx,center}}{P_{yy,center}}\right\}}\right) \quad (12)$$

The amount of fluctuations in the state of polarization is indicated by the inner product of the Stokes vectors. The SOP monitoring unit 48 derives the frequency f of fluctuations in the state of polarization, which is the SOP fluctuation speed, as given in Formula (13).

[Formula 13]
$$f = \frac{1}{(t_2-t_1)\pi}\arcsin\left(\frac{1}{2}|S(t_2)-S(t_1)|\right) \quad (13)$$

If the frequency f of fluctuations in the state of polarization is equal to or greater than a frequency threshold, the SOP monitoring unit 48 changes the values of the step size parameters respectively used by the FIR filters to a value larger than the predetermined value in normal time. With this, the SOP monitoring unit 48 can increase the tap coefficient of the FIR filter 470.

If it is determined that a SOP fluctuation speed lower than the speed threshold has been detected during the predetermined period, the SOP monitoring unit 48 may also output, to three or less of the four coefficient updating units, an instruction to switch the value of the step size parameter to the predetermined value in normal time (instruction to set the value of the step size parameter back to the predetermined value in normal time).

As described above, the adaptive equalizer 47 of the fourth embodiment executes adaptive equalization processing, using a tap coefficient of each combination of the X polarized wave and the Y polarized wave. The coefficient updating units 490 to 493 update the tap coefficient for each of the combinations, based on the step size for the corresponding combination. If it is determined that the SOP fluctuation speed is higher than or equal to the speed threshold, the SOP monitoring unit 48 (control unit) stops the update of the value of the step size parameter for each of the combinations, and sets the value of the step size parameter for each of the combinations to "large (value larger than the predetermined value in normal time)" (second size).

With this, the digital coherent receiver 4 of the fourth embodiment can reduce the likelihood that the reception performance may decrease when the state of polarization of a polarization-multiplexed signal fluctuates rapidly.

Since the adaptive equalization device 100 of the fourth embodiment uses the single-stage FIR filters to reduce the likelihood that the reception performance may decrease in the event of a fluctuation in the state of polarization, the circuit size of the adaptive equalization device 100 of the fourth embodiment is smaller than the circuit size of a configuration in which two-stage FIR filters are used to reduce the likelihood that the reception performance may decrease in the event of a fluctuation in the state of polarization. The possibility of the adaptive equalization device 100 of the fourth embodiment adapting to fluctuations in polarization does not impaired even if the value of the step size parameter is low.

Fifth Embodiment

Figure 7:
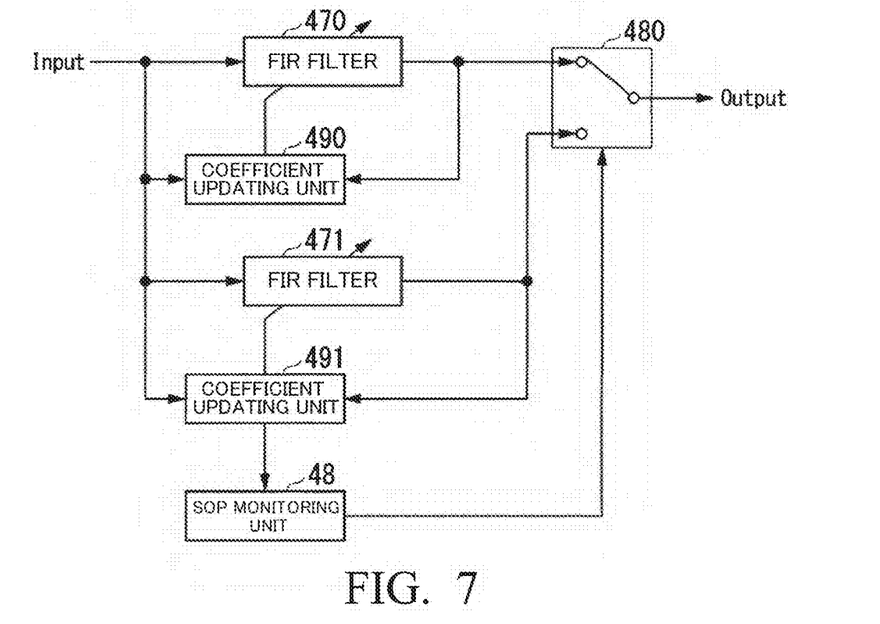
FIG. 7 is a diagram illustrating an example of a configuration of the adaptive equalization device according to a fifth embodiment.

A fifth embodiment differs from the third embodiment in that the adaptive equalization device 100 includes two-stage FIR filters arranged in parallel to each other with respect to the flow of a digital signal from the wavelength dispersion compensation unit 46 to the frequency offset compensation unit 50. In the fifth embodiment, the difference from the third embodiment will be described.

FIG. 7 is a diagram illustrating an example of a configuration of the adaptive equalization device 100. In the fifth embodiment, the adaptive equalization device 100 uses the two-stage FIR filters arranged in parallel to each other to reduce the likelihood that the reception performance may decrease in the event of a fluctuation in the state of polarization. The adaptive equalization device 100 includes the FIR filter 470 (two-by-two butterfly structured FIR filter), the FIR filter 471 (two-by-two butterfly structured FIR filter), the switching unit 480, the coefficient updating unit 490, the coefficient updating unit 491, and the SOP monitoring unit 48.

The FIR filter 470 is a two-by-two butterfly structured FIR filter. The FIR filter 470 outputs a digital signal on which adaptive equalization processing has been executed by the FIR filter 470 to the switching unit 480. The FIR filter 471 outputs a digital signal on which adaptive equalization processing has been executed by the FIR filter 471 to the switching unit 480.

The coefficient updating unit 490 is a functional unit for updating the tap coefficient of the FIR filter 470. The coefficient updating unit 490 sets the tap coefficient updated using the value of the step size parameter of "small (predetermined value in normal time)" for the FIR filter 470. The coefficient updating unit 490 acquires the digital signal on which the adaptive equalization processing has been executed by the FIR filter 470 from the FIR filter 470.

The coefficient updating unit 491 is a functional unit for updating the tap coefficient of the FIR filter 471. The coefficient updating unit 491 sets the tap coefficient updated using the value of the step size parameter of "large (value larger than the predetermined value in normal time)" for the FIR filter 471. The coefficient updating unit 491 acquires the digital signal on which the adaptive equalization processing has been executed by the FIR filter 471 from the FIR filter 471.

If it is determined that a SOP fluctuation speed lower than the speed threshold has been detected during the predetermined period, that is, if it is determined that no SOP fluctuation speed higher than or equal to the speed threshold has been detected during the predetermined period, the SOP monitoring unit 48 selects the coefficient updating unit 490. The SOP monitoring unit 48 outputs the selection result indicating the coefficient updating unit 490 to the switching unit 480. Accordingly, the switching unit 480 can output the digital signal on which the adaptive equalization processing has been executed by the FIR filter 470 having a small tap coefficient, to the frequency offset compensation unit 50.

If it is determined that a SOP fluctuation speed higher than or equal to the speed threshold has been detected during the predetermined period, the SOP monitoring unit 48 selects the coefficient updating unit 491. The SOP monitoring unit 48 outputs the selection result indicating the coefficient updating unit 491 to the switching unit 480. Accordingly, the switching unit 480 can output the digital signal on which the adaptive equalization processing has been executed by the FIR filter 471 having a large tap coefficient, to the frequency offset compensation unit 50.

As described above, if it is determined that the SOP fluctuation speed is lower than the speed threshold, the adaptive equalizer 47 of the fifth embodiment executes the adaptive equalization processing using the tap coefficient (first tap coefficient) determined by the coefficient updating unit 490 using the value of the step size parameter of "small (predetermined value in normal time)" (first size). If it is determined that the SOP fluctuation speed is higher than or equal to the speed threshold, the adaptive equalizer 47 executes the adaptive equalization processing using the tap coefficient (second tap coefficient) determined by the coefficient updating unit 491 using the value of the step size parameter of "large (value larger than the predetermined value in normal time)" (second size).

With this, the digital coherent receiver 4 of the fifth embodiment can reduce the likelihood that the reception performance may decrease when the state of polarization of a polarization-multiplexed signal fluctuates rapidly.

Sixth Embodiment

Figure 8:
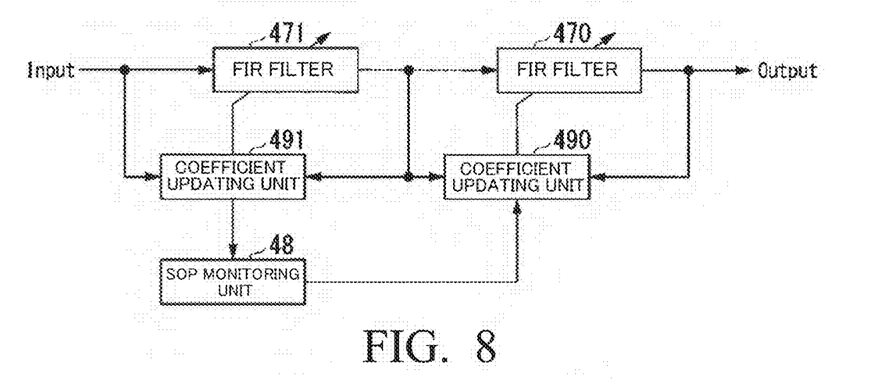
FIG. 8 is a diagram illustrating an example of a configuration of the adaptive equalization device according to a sixth embodiment.

The sixth embodiment differs from the first embodiment in that the adaptive equalization device 100 includes two-stage FIR filters arranged in series to each other with respect to the flow of a digital signal from the wavelength dispersion compensation unit 46 to the frequency offset compensation unit 50. In the sixth embodiment, the difference from the first embodiment will be described.

FIG. 8 is a diagram illustrating an example of a configuration of the adaptive equalization device 100. In the fifth embodiment, the adaptive equalization device 100 uses the two-stage FIR filters arranged in series to each other to reduce the likelihood that the reception performance may decrease in the event of a fluctuation in the state of polarization. The adaptive equalization device 100 includes the FIR filter 470 (two-by-two butterfly structured FIR filter), the FIR filter 471 (two-by-two butterfly structured FIR filter), the switching unit 480, the coefficient updating unit 490, the coefficient updating unit 491, and the SOP monitoring unit 48.

The FIR filter 470 is a two-by-two butterfly structured FIR filter. The FIR filter 470 is a FIR filter arranged downstream of the FIR filter 471. The FIR filter 470 executes, on a digital signal input to the FIR filter 470 from the FIR filter 471, adaptive equalization processing based on a tap coefficient set by the coefficient updating unit 490. The FIR filter 470 outputs the digital signal on which the adaptive equalization processing has been executed by the FIR filter 470 to the frequency offset compensation unit 50 and the coefficient updating unit 490.

The FIR filter 471 is a two-by-two butterfly structured FIR filter. The FIR filter 471 is a FIR filter arranged upstream of the FIR filter 470. The FIR filter 471 executes, on the digital signal on which the wavelength dispersion compensation processing has been executed by the wavelength dispersion compensation unit 46, adaptive equalization processing based on a tap coefficient set by the coefficient updating unit 491. The FIR filter 471 outputs the digital signal on which the adaptive equalization processing has been executed to the FIR filter 470 and the coefficient updating unit 490.

The coefficient updating unit 490 is a functional unit for updating the tap coefficient of the FIR filter 470. The coefficient updating unit 490 acquires, from the FIR filter 471, the digital signal on which the adaptive equalization processing has been executed by the FIR filter 471. The coefficient updating unit 490 acquires, from the FIR filter 470, the digital signal on which the adaptive equalization processing has been executed by the FIR filter 470.

Upon acquiring an instruction to switch the value of the step size parameter to the predetermined value in normal time from the SOP monitoring unit 48, the coefficient updating unit 490 updates the tap coefficient of the FIR filter 470 using the predetermined value in normal time for the step size parameter. Upon acquiring an instruction to switch the value of the step size parameter to a value larger than the predetermined value in normal time from the SOP monitoring unit 48, the coefficient updating unit 490 updates the value of the step size parameter to a value larger than the predetermined value in normal time. The coefficient updating unit 490 sets the updated tap coefficient for the FIR filter 470.

The coefficient updating unit 491 is a functional unit for updating the tap coefficient of the FIR filter 471. The coefficient updating unit 491 acquires, from the wavelength dispersion compensation unit 46, the digital signal on which the wavelength dispersion compensation processing has been executed by the wavelength dispersion compensation unit 46. The coefficient updating unit 491 acquires, from the FIR filter 471, the digital signal on which the adaptive equalization processing has been executed by the FIR filter 471.

In the normal time where no rapid fluctuation in the state of polarization is detected, the coefficient updating unit 491 uses a value larger than the predetermined value in normal time set for the step size parameter to update the tap coefficient of the FIR filter 471. The coefficient updating unit 491 sets the updated tap coefficient for the FIR filter 471.

The SOP monitoring unit 48 acquires, from the coefficient updating unit 491, the tap coefficient determined by the coefficient updating unit 491. The SOP monitoring unit 48 derives, based on the tap coefficient determined by the coefficient updating unit 491, the value of the Stokes parameter indicating the state of polarization of the digital signal. The SOP monitoring unit 48 periodically detects, based on the derived value of the Stokes parameter, the SOP fluctuation speed at a predetermined period. The SOP monitoring unit 48 outputs information indicating the detected SOP fluctuation speed to the coefficient updating unit 490 and the coefficient updating unit 491.

The SOP monitoring unit 48 determines whether or not a SOP fluctuation speed higher than or equal to the speed threshold has been detected during the predetermined period. If it is determined that a SOP fluctuation speed higher than or equal to the speed threshold has been detected during the predetermined period, the SOP monitoring unit 48 outputs, to the coefficient updating unit 490, an instruction to switch the value of the step size parameter to a value larger than the predetermined value in normal time. Therefore, the SOP monitoring unit 48 enables the digital signal on which the adaptive equalization processing has been performed by the FIR filter 470 having a large tap coefficient to be output to the frequency offset compensation unit 50 from the FIR filter 470.

If it is determined that a SOP fluctuation speed lower than the speed threshold has been detected during the predetermined period, the SOP monitoring unit 48 outputs, to the coefficient updating unit 490, an instruction to switch the value of the step size parameter to the predetermined value in normal time (an instruction to set the value of the step size parameter back to the predetermined value in normal time).

As described above, if it is determined that the SOP fluctuation speed is lower than the speed threshold, the adaptive equalizer 47 of the sixth embodiment executes the adaptive equalization processing, using the tap coefficient (first tap coefficient) determined by the downstream coefficient updating unit 490 using the value of the step size parameter of "small (predetermined value in normal time)" (first size), and the tap coefficient (second tap coefficient) determined by the upstream coefficient updating unit 491 using the value of the step size parameter of "large (value larger than the predetermined value in normal time)" (second size). If it is determined that the SOP fluctuation speed is higher than or equal to the speed threshold, the adaptive equalizer 47 executes the adaptive equalization processing, using the tap coefficient (first tap coefficient) changed by the coefficient updating unit 490, and the tap coefficient (second tap coefficient) determined by the coefficient updating unit 491.

With this, the digital coherent receiver 4 of the sixth embodiment can reduce the likelihood that the reception performance may decrease when the state of polarization of a polarization-multiplexed signal fluctuates rapidly.

The digital coherent receiver 4 of the sixth embodiment can execute more accurate adaptive equalization processing with the downstream FIR filter 470. The digital coherent receiver 4 of the sixth embodiment can further improve the signal quality.

Seventh Embodiment

Figure 9:
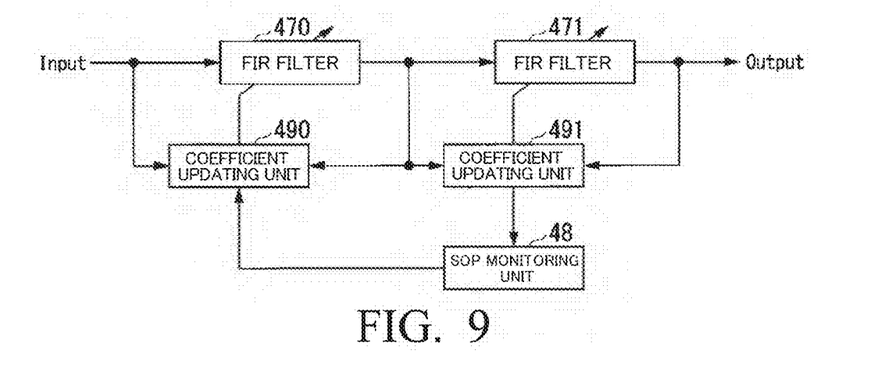
FIG. 9 is a diagram illustrating an example of a configuration of the adaptive equalization device according to a seventh embodiment.

A seventh embodiment differs from the sixth embodiment in that the SOP monitoring unit 48 operates based on the tap coefficient determined by the downstream coefficient updating unit 491. In the seventh embodiment, the difference from the sixth embodiment will be described.

FIG. 9 is a diagram illustrating an example of a configuration of the adaptive equalization device 100. In the sixth embodiment, the adaptive equalization device 100 uses two-stage FIR filters arranged in series to each other to reduce the likelihood that the reception performance may decrease in the event of a fluctuation in the state of polarization. The adaptive equalization device 100 includes the FIR filter 470 (two-by-two butterfly structured FIR filter), the FIR filter 471 (two-by-two butterfly structured FIR filter), the switching unit 480, the coefficient updating unit 490, the coefficient updating unit 491, and the SOP monitoring unit 48.

The coefficient updating unit 490 is a functional unit for updating the tap coefficient of the FIR filter 470. The coefficient updating unit 490 acquires, from the wavelength dispersion compensation unit 46, the digital signal on which the wavelength dispersion compensation processing has been executed by the wavelength dispersion compensation unit 46. The coefficient updating unit 490 acquires, from the FIR filter 470, the digital signal on which the adaptive equalization processing has been executed by the FIR filter 470.

Upon acquiring an instruction to switch the value of the step size parameter to the predetermined value in normal time from the SOP monitoring unit 48, the coefficient updating unit 490 updates the tap coefficient of the FIR filter 470 using the predetermined value in normal time set for the step size parameter. Upon acquiring an instruction to switch the value of the step size parameter to a value larger than the predetermined value in normal time from the SOP monitoring unit 48, the coefficient updating unit 490 updates the value of the step size parameter to a value larger than the predetermined value in normal time. The coefficient updating unit 490 outputs the updated tap coefficient to the FIR filter 470.

The coefficient updating unit 491 is a functional unit for updating the tap coefficient of the FIR filter 471. The coefficient updating unit 491 acquires, from the FIR filter 470, the digital signal on which the adaptive equalization processing has been executed by the FIR filter 470. The coefficient updating unit 491 acquires, from the FIR filter 471, the digital signal on which the adaptive equalization processing has been executed by the FIR filter 471.

In the normal time where no rapid fluctuation in the state of polarization is detected, the coefficient updating unit 491 update the tap coefficient of the FIR filter 471, using a value larger than the predetermined value in normal time set for the step size parameter. The coefficient updating unit 491 sets the updated tap coefficient for the FIR filter 471.

The SOP monitoring unit 48 acquires, from the coefficient updating unit 491, the tap coefficient determined by the coefficient updating unit 491. The SOP monitoring unit 48 derives, based on the tap coefficient determined by the coefficient updating unit 491, the value of the Stokes parameter indicating the state of polarization of the digital signal. The SOP monitoring unit 48 periodically detects, based on the derived value of the Stokes parameter, the SOP fluctuation speed at a predetermined period. The SOP monitoring unit 48 outputs information indicating the detected SOP fluctuation speed to the coefficient updating unit 490 and the coefficient updating unit 491.

The SOP monitoring unit 48 determines whether or not a SOP fluctuation speed higher than or equal to the speed threshold has been detected during the predetermined period. If it is determined that a SOP fluctuation speed higher than or equal to the speed threshold has been detected during the predetermined period, the SOP monitoring unit 48 outputs, to the coefficient updating unit 490, an instruction to switch the value of the step size parameter to a value larger than the predetermined value in normal time. Accordingly, the SOP monitoring unit 48 enables the digital signal on which the adaptive equalization processing has been executed by the FIR filter 470 having a large tap coefficient to be output to the frequency offset compensation unit 50 from the FIR filter 471.

If it is determined that a SOP fluctuation speed lower than the speed threshold has been detected during the predetermined period, the SOP monitoring unit 48 outputs, to the coefficient updating unit 490, an instruction to switch the value of the step size parameter to the predetermined value in normal time (instruction to set the value of the step size parameter back to the predetermined value in normal time).

As described above, if it is determined that the SOP fluctuation speed is lower than the speed threshold, the adaptive equalizer 47 of the seventh embodiment executes the adaptive equalization processing, using the tap coefficient (first tap coefficient) determined by the upstream coefficient updating unit 490 using the value of the step size parameter of "small (predetermined value in normal time)" (first size), and the tap coefficient (second tap coefficient) determined by the downstream coefficient updating unit 491 using the value of the step size parameter of "large (value larger than the predetermined value in normal time)" (second size). If it is determined that the SOP fluctuation speed is higher than or equal to the speed threshold, the adaptive equalizer 47 executes the adaptive equalization processing, using the tap coefficient (first tap coefficient) changed by the coefficient updating unit 490, and the tap coefficient (second tap coefficient) determined by the coefficient updating unit 491.

With this, the digital coherent receiver 4 of the seventh embodiment can reduce the likelihood that the reception performance may decrease when the state of polarization of a polarization-multiplexed signal fluctuates rapidly.

Although the embodiment of the present invention has been described in detail with reference to the drawings, the specific configurations are not limited to these embodiments, and encompasses designs and the like without departing from the spirit of the present invention.

In the above-described embodiments, the digital coherent transmitter and the digital coherent receiver are realized partially or entirely by hardware such as, for example, a large scale integration (LSI) and an application specific integrated circuit (ASIC). The digital coherent transmitter and the digital coherent receiver may be realized partially or entirely by a processor such as a central processing unit (CPU) executing a program stored in a storage unit. The storage unit is preferably a nonvolatile recording medium (non-transitory recording medium) such as, for example, a flash memory and a Hard Disk Drive (HDD). The storage unit may be provided with a volatile recording medium such as a Random Access Memory (RAM).

INDUSTRIAL APPLICABILITY

The present invention is applicable to an optical communication system.

REFERENCE SIGNS LIST

1 Optical communication system
2 Digital coherent transmitter
3 Transmission path
4 Digital coherent receiver
40 Polarization demultiplexer
41 Local light source
42 Polarization diversity 90-degree hybrid
43 Amplifier
44 ADC
45 Signal processing unit
46 Wavelength dispersion compensation unit
47 Adaptive equalizer 48 SOP monitoring unit
49 Coefficient updater
50 Frequency offset compensation unit
51 Phase offset compensation unit
52 Symbol demapping unit
53 Soft decision error correction unit
54 Hard decision error correction unit
100 Adaptive equalization device
470 to 473 FIR filter
474 Multiplexing unit
475 Multiplexing unit
480 Switching unit
490 to 493 Coefficient updating unit

The invention claimed is:

1. A digital coherent receiver comprising:
an adaptive equalizer executing, using a first tap coefficient, adaptive equalization processing on a digital signal that corresponds to a polarization-multiplexed signal;
a first coefficient updater updating the first tap coefficient based on the digital signal on which the adaptive equalization processing has not been executed, the digital signal on which the adaptive equalization processing has been executed, and a first step size;
a second coefficient updater updating a second tap coefficient based on the digital signal on which the adaptive equalization processing has not been executed, the digital signal on which the adaptive equalization processing has been executed, and a second step size, which is larger than the first step size; and
a controller detecting a fluctuation speed of a state of polarization of the digital signal based on the second tap coefficient, determining whether or not the fluctuation speed is higher than or equal to a speed threshold, and changing the first tap coefficient to the updated second tap coefficient if it is determined that the fluctuation speed is higher than or equal to the speed threshold,
wherein each of the adaptive equalizer, the first coefficient updater, the second coefficient updater and the controller is implemented by:
i) computer executable instructions executed by at least one processor,
ii) at least one circuitry or
iii) a combination of computer executable instructions executed by at least one processor and at least one circuitry.

2. The digital coherent receiver according to claim 1, wherein if it is determined that the fluctuation speed is lower than the speed threshold, the adaptive equalizer executes the adaptive equalization processing using the first tap coefficient, and if it is determined that the fluctuation speed is higher than or equal to the speed threshold, the adaptive equalizer executes the adaptive equalization processing using the second tap coefficient.

3. The digital coherent receiver according to claim 1, wherein if it is determined that the fluctuation speed is lower than the speed threshold, the adaptive equalizer executes the adaptive equalization processing using the first tap coefficient and the second tap coefficient, and if it is determined that the fluctuation speed is higher than or equal to the speed threshold, the adaptive equalizer executes the adaptive equalization processing using the changed first tap coefficient and second tap coefficient.

4. A digital coherent receiver comprising:
an adaptive equalizer executing, using a tap coefficient, adaptive equalization processing on a digital signal that corresponds to a polarization-multiplexed signal;
a coefficient updater updating the tap coefficient based on the digital signal on which the adaptive equalization processing has not been executed, the digital signal on which the adaptive equalization processing has been executed, and a step size that is periodically updated to a first size and a second size, which is larger than the first size; and
a controller detecting a fluctuation speed of a state of polarization of the digital signal based on the tap coefficient, determining whether or not the fluctuation speed is higher than or equal to a speed threshold, and stopping the update of the step size and setting the step size to the second size if it is determined that the fluctuation speed is higher than or equal to the speed threshold,
wherein each of the adaptive equalizer, the coefficient updater and the controller is implemented by:
i) computer executable instructions executed by at least one processor,
ii) at least one circuitry or
iii) a combination of computer executable instructions executed by at least one processor and at least one circuitry.

5. The digital coherent receiver according to claim 4, wherein the adaptive equalizer executes the adaptive equalization processing using the tap coefficient for each combination of an X polarized wave and a Y polarized wave, the coefficient updater updates the tap coefficient for each of the combinations, based on the step size for the corresponding combination, and if it is determined that the fluctuation speed is higher than or equal to the speed threshold, the controller stops the update of the step size for each of the combinations, and sets the step size for each of the combinations to the second size.

6. A digital coherent method that is executed by the digital coherent receiver, the method comprising:
executing, using a first tap coefficient, adaptive equalization processing on a digital signal that corresponds to a polarization-multiplexed signal;
updating the first tap coefficient based on the digital signal on which the adaptive equalization processing has not been executed, the digital signal on which the adaptive equalization processing has been executed, and a first step size;
updating a second tap coefficient based on the digital signal on which the adaptive equalization processing has not been executed, the digital signal on which the adaptive equalization processing has been executed, and a second step size, which is larger than the first step size; and
detecting a fluctuation speed of a state of polarization of the digital signal based on the second tap coefficient, determining whether or not the fluctuation speed is higher than or equal to a speed threshold, and changing the first tap coefficient to the updated second tap coefficient if it is determined that the fluctuation speed is higher than or equal to the speed threshold.

7. The digital coherent receiving method according to claim 6, wherein if it is determined that the fluctuation speed is lower than the speed threshold, the adaptive equalizer executes the adaptive equalization processing using the first tap coefficient, and if it is determined that the fluctuation speed is higher than or equal to the speed threshold, the adaptive equalizer executes the adaptive equalization processing using the second tap coefficient.

8. A digital coherent method that is executed by a digital coherent receiver, the method comprising:
- executing, using a tap coefficient, adaptive equalization processing on a digital signal that corresponds to a polarization-multiplexed signal;
- updating the tap coefficient based on the digital signal on which the adaptive equalization processing has not been executed, the digital signal on which the adaptive equalization processing has been executed, and a step size that is periodically updated to a first size and a second size, which is larger than the first size; and
- detecting a fluctuation speed of a state of polarization of the digital signal based on the tap coefficient, determining whether or not the fluctuation speed is higher than or equal to a speed threshold, and stopping the update of the step size and setting the step size to the second size if it is determined that the fluctuation speed is higher than or equal to the speed threshold.

* * * * *